United States Patent [19]

Miyawaki

[11] Patent Number: 4,766,492
[45] Date of Patent: Aug. 23, 1988

[54] PAPER MASK ASSEMBLY FOR USE IN PHOTOGRAPHIC PRINTING

[75] Inventor: Hiroshi Miyawaki, Wakayama, Japan

[73] Assignee: Noritsu Kenkyu Center Co., Ltd., Wakayama, Japan

[21] Appl. No.: 90,990

[22] Filed: Aug. 31, 1987

[30] Foreign Application Priority Data

Aug. 30, 1986 [JP] Japan ................................ 61-133539

[51] Int. Cl.⁴ ............................................. G03B 27/28
[52] U.S. Cl. ........................................ 355/125; 355/74
[58] Field of Search ...................................... 355/125, 74

[56] References Cited

U.S. PATENT DOCUMENTS 2,895,396  7/1959  Pollock et al. ...................... 355/125
4,325,630  4/1982  Kimura et al. ........................ 355/74
4,469,438  9/1984  Itikawa ................................. 355/74
4,607,949  8/1986  Hakamada et al. .................. 355/74

Primary Examiner—Monroe H. Hayes
Attorney, Agent, or Firm—Armstrong, Nikaido, Marmelstein & Kubovcik

[57] ABSTRACT

A paper mask assembly having a frame which holds a paper mask disposed very near a photographic paper. When changing the size of the opening of the paper mask or replacing a paper mask with another one having an opening of different size, the paper mask is liable to damage the photographic paper. To avoid this, the frame can be pivoted by means of a working arm driven by a reversible motor. The working arm has one end pivotally mounted on the frame and the other end fixedly mounted on the drive shaft of the motor.

4 Claims, 2 Drawing Sheets

PAPER MASK ASSEMBLY FOR USE IN PHOTOGRAPHIC PRINTING

The present invention relates to a paper mask assembly for use in photographic printing.

In view of the intended use, a paper mask should preferably be kept positioned nearly in contact with a web of photographic paper which has been brought into the area for light exposure. A paper mask is therefore usually held in such a position that it nearly contacts the photographic paper at a printing exposure unit, whether the paper mask is of the auto-mask type in which the size of its opening is changeable as desired or is of such a replacement type that a proper paper mask is selected from among a plurality of paper masks provided with openings of different sizes.

With the paper mask positioned nearly in contact with the photographic paper, if the paper mask is of the auto-mask type, in narrowing the width of its opening than the width of paper to print edged photographs, the photographic paper may be caught on its side edges by the side edges of the paper mask opening. With the insertion type paper mask, when inserted in parallel with the photographic paper in a crosswise direction, the paper mask is liable to scratch the side edges of the photographic paper, causing it to curl or damaging its emulsion surface.

In order to avoid such troubles, when changing the size of the opening of the paper mask or when replacing the paper mask, the photographic paper has to be temporarily rewound into a supply roll away from the printing/exposure section. After setting the paper mask in position, the photographic paper is drawn out of the supply roll again. The winding and unwinding are so troublesome as to worse the working efficiency considerably.

It is an object of the present invention to provide a paper mask assembly which obviates the abovesaid shortcomings and which will not damage a photographic paper while changing the size of the opening of a paper mask or replacing a paper mask.

In accordance with the present invention, there is provided a paper mask assembly for use in photographic printing, comprising: a frame movably mounted for holding a paper mask in a position adjacent to a photographic paper; a working arm having one end thereof pivotally mounted to the frame; a drive means fixedly mounted for pivoting the working arm, whereby moving the frame and thus the paper mask away from and toward the photographic film.

When it is desired to change the size of the opening of the paper mask or replace the paper mask, the motor is actuated to pivot the working arm by a predetermined angle and thus move the box-like frame loaded with a paper mask so that the paper mask will move away from the photographic paper.

After the frame has been displaced to a position spaced from the photographic paper, either the frame plates are slid to predetermined positions (in case of an auto-mask type) or the paper mask is replaced with another one.

After this operation, the motor is reversed to turn the working arm in the opposite direction by a predetermined angle to bring the box-like frame back to its original position so that the paper mask will be adjacent to the photographic paper.

Thus the paper mask assembly according to this invention will prevent the damage of a photographic paper particularly at its side edges which may be caused by tucking or picking its side edges into the paper mask. This invention will also prevent the damage to the emulsion surface of the photographic paper resulting from the friction with the paper mask.

Other features and objects of the present invention will become apparent from the following description taken with reference to the accompanying drawings, in which.

Figure 1:
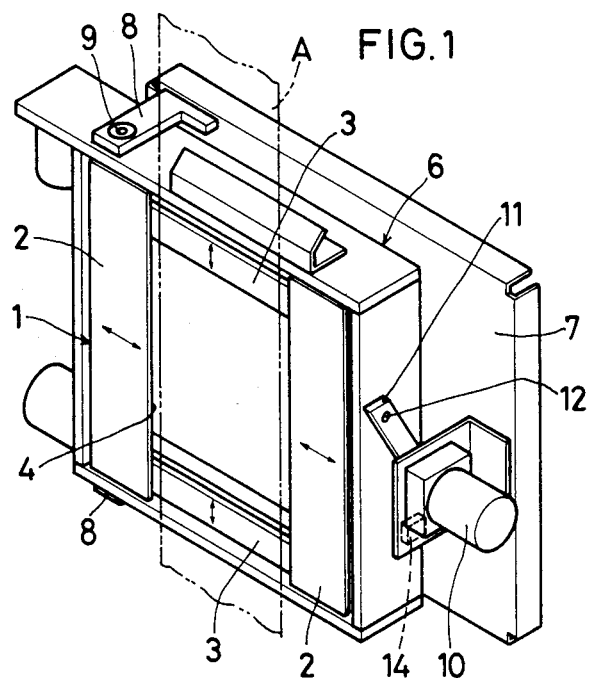
FIG. 1 is a perspective view of the paper mask assembly embodying the present invention.
Figure 2:
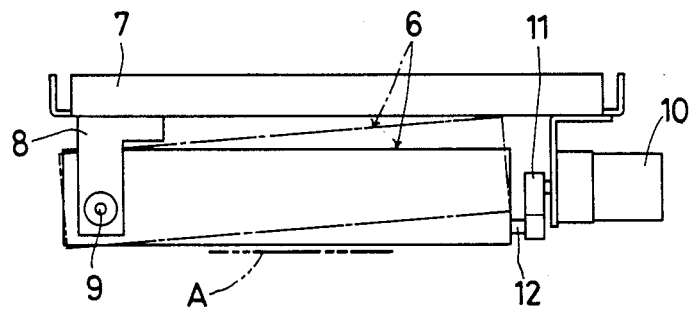
FIG. 2 is a plan view of the same.

Firstly referring to FIGS. 1 and 2, a paper mask 1 of the auto-mask type comprises one pair of vertical frame plates 2 and one pair of horizontal frame plates 3. Each pair of plates 2, 3 are movable relative to and parallel to each other in the direction of arrows so that the size of an opening 4 defined by these plates will be changeable.

A box-like frame 6 provided with the auto-mask type paper mask 1 has its one end pivotally coupled to a pair of brackets 8 protruding from a machine frame 7, while its other end is pivotally mounted through a shaft 12 to one end of a working arm 11 having its other end fixed to the drive shaft of a reversible motor 10 fixedly mounted on the machine frame 7. With the pivotal movement of the working arm 11 around the drive shaft within a predetermined angle range, the box-like frame 6 located substantially in parallel with the machine frame 7 and adjacent to the path of photographic paper A is pivoted around a shaft 9 mounted on the brackets 8 so as to move its other end away from the machine frame (FIG. 2), causing the paper mask 1 to move away from the photographic paper by a predetermined angle.

With the frame in this position, each pair of the frame plates 2 and 3 in the pivoted box-like frame 6 are moved toward or away from each other to set the size of the opening 4. The motor 10 is then actuated in the reverse direction to move the frame 6 back to its original position close to and in parallel with the photographic paper A.

A limit switch 14 is provided to restrict the angle of swing of the working arm 11 and thus control the amount of pivotal movement of the box-like frame 6 away from and back to its operative position.

Figure 3:
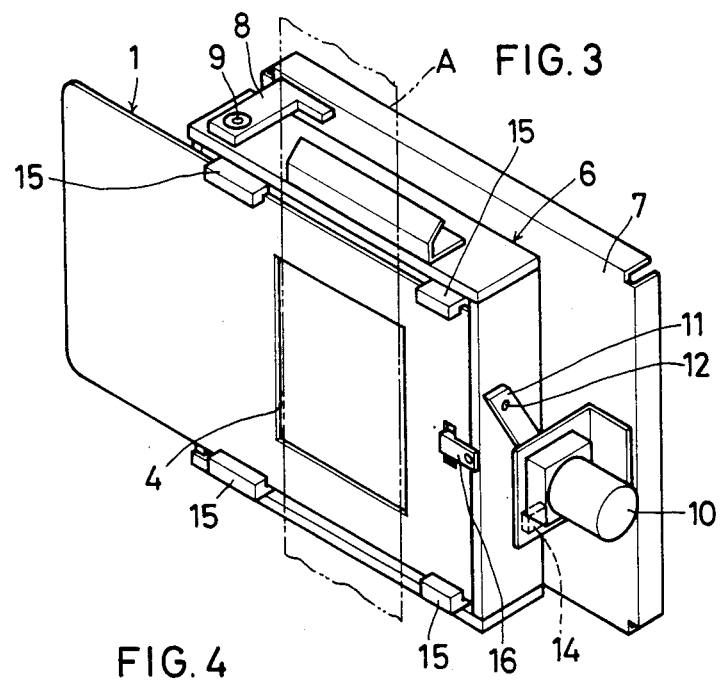
FIGS. 3 and 4 are perspective views of other embodiments.

FIG. 3 shows another embodiment of the paper mask assembly in which a plurality of paper masks each formed with an opening 4 having different sizes are provided. One paper mask 1 selected therefrom is inserted into the boxlike frame 6, guided by a plurality of guide claws 15 protruding from the back of the frame 6. The paper mask 1 fully inserted into the frame 6 is held in position by a stopper claw 16.

Figure 4:
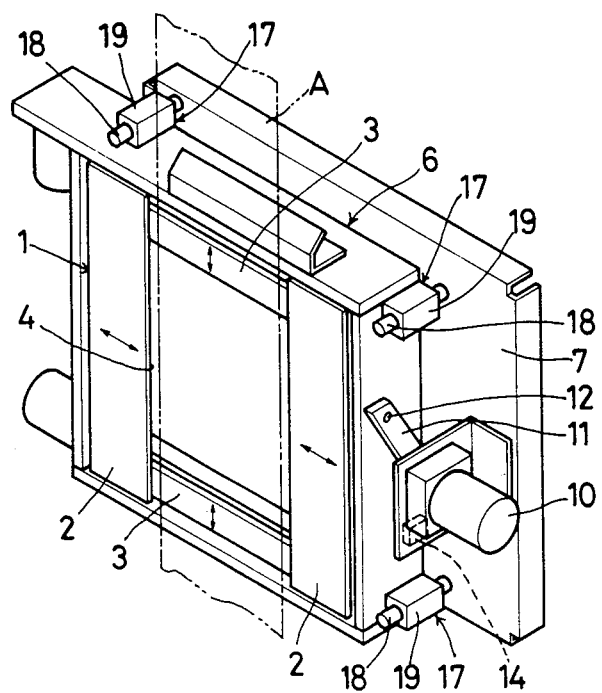

FIG. 4 shows another embodiment in which the box-like frame 6 loaded with the auto-mask type paper mask 1 as shown in FIG. 1 is supported at its four corners on slide shafts 17 provided on the machine frame 7, instead of pivotally mounting the frame 6 by means of brackets as in the first embodiment. Each slide shaft 17 comprises a small diameter shaft 18 covered with a lubricating member 19 of an oil-impregnated metal or Teflon (Trade Mark) for smooth sliding movement of the frame 6 on the slide shafts 17.

The motor 10 is actuated to turn the working arm 11 by a predetermined angle and thus to raise the frame 6 toward the machine frame 7 along the slide shafts 17 while keeping parallel with the machine frame 7. After the paper mask 1 has been sufficiently spaced apart from the photographic paper, the size of the opening of the paper mask 1 is changed. If it is an insertion type mask, it is replaced with another one.

What is claimed is:

1. A paper mask assembly for use in photographic printing, comprising:
    a frame movably mounted for holding a paper mask in a position adjacent to a photographic paper;
    a working arm having one end thereof pivotally mounted to said frame;
    a drive means fixedly mounted for pivoting said working arm, whereby moving said frame and thus the paper mask away from and toward the photographic paper.

2. A paper mask assembly as claimed in claim 1, wherein the pivotal movement of said working arm is controlled by means of a limit switch.

3. A paper mask assembly as claimed in claim 1, wherein said frame is mounted to be pivotable around a vertical shaft.

4. A paper mask assembly as claimed in claim 1, wherein said frame is mounted to be slidable along a plurality of slide shafts, keeping in parallel with the photographic paper.

* * * * *